United States Patent Office 3,462,526
Patented Aug. 19, 1969

3,462,526
ANTIVIRAL CANINE VACCINE AND PROCESS FOR MAKING THE SAME
Yves de Ratuld and Georges Werner, Sceaux, France, assignors to Rhone-Poulenc S.A., Paris, France, a French body corporate
No Drawing. Filed Nov. 14, 1966, Ser. No. 593,692
Claims priority, application France, Nov. 17, 1965, 38,768
Int. Cl. A61k 23/00; C12k 5/00
U.S. Cl. 424—90         10 Claims

ABSTRACT OF THE DISCLOSURE

A vaccine for immunizing young dogs against rhinitis and bronchopneumonia is prepared by inoculating a cellular culture of fibroblastic lung cells of a dog foetus in a suitable medium with a virus cultivated in vitro and isolated from renal cells of a dog infected by rhinitis and bronchopneumonia and which is capable of causing in the young dog lesions of pneumonia, hepatitis, nephritis and encephalitis. This inoculated culture is incubated until a cytopathogenic effect is produced, liberating the virus from the cells, after which the cellular debris is removed and the resulting viral suspension is inactivated with propiolactone or ultraviolet irradiation to produce the vaccine.

---

This invention relates to the preparation of a vaccine comprising as active substance a newly isolated virus cultivated by an original method and inactivated by an appropriate technique.

The new virus employed to prepare the vaccine of the present invention produces in the young dog lesions of pneumonia, hepatitis, nephritis and encephalitis.

Isolation and culture of the virus

Cellular cultures were prepared by trypsination of kidneys taken from a pup suffering from rhinitis and bronchopneumonia. Two days after the commencement of the culture (medium: 0.5% of casein hydrolysate, 10% of calf serum in Hanks solution, 100 µg./cc. of penicillin and streptomycin, incubation at 37° C.), a continuous monocellular layer was obtained, which was essentially fibroblastic, in which there subsequently appeared, only in a few cultures, accumulations of refractive cells. A few days later, these gave way to areas of cellular lysis, having a diameter of up to 5 mm., bordered by refractive necrotic cells.

The mixture of liquid and cells, prepared by rapid freezing and thawing of these cultures, was inoculated into epithelial cellular cultures of a healthy dog's kidneys. A cytopathogenic effect was reproduced up to a dilution of $10^{-3}$ of the original material.

The trypsination of the lungs of a dog foetus taken by Caesarean operation at the 50th day of gestation made it possible to obtain a fibroblastic cellular strain which can be cultivated in series by repeated transfer and preserved by freezing. By inoculating into this cellular system the preceding infected epithelial cultures (liquid and cells) it was possible to reproduce the cytopathogenic effect originally observed and also to note a considerable lowering of the infective titer in the course of a single passage through the epithelial renal cells.

The infective titer corresponds to the number of units of virulence per unit volume. It is evaluated by diluting the viral suspension in accordance with successive powers of 10, in an appropriate medium, and then inoculating into receptive cellular cultures known volumes of the dilutions obtained, and finally noting those cultures whose cells exhibit a cytopathogenic effect after a given time of incubation at an appropriately chosen temperature. The 50% infective titer in a tissue culture (hereinafter called "$DICT_{50}$") is the dilution of viral suspension which produces cytopathogenic lesions in one out of two inoculated cellular cultures; this titer is calculated by the method of Reed and Muench, Am. J. Hyg. 27, 493 (1938).

Subsequent passages in cultures of the fibroblastic strain showed the abundant multiplication of the cytopathogenic agent; circular areas visible to the naked eye appear 24 to 72 hours after the inoculation, depending upon the amount of inoculation. During a minimum period of 8 hours after the infection, the virus disappears from the medium. From the 16th hour, the infective titer (extra- and intra-cellular) of the inoculated cultures increases constantly, and reaches the maximum value of $10^{6.2}$ $DICT_{50}$ per cc. at the 72nd hour. It decreases considerably in the course of the succeeding four days.

The propagation in series of this cytopathogenic agent in the fibroblastic cellular strain allowed of a study of its principal biological characteristics.

Biological characteristics (a) Serological studies have shown that this new virus has no antigenic relationship, on the one hand, with the virus of Carre's disease (dog distemper) and on the other hand with the virus of Rubarth's disease (canine hepatitis).

The serum of a dog which has received an experimental intranasal inoculation of a culture of the virus neutralises, in a dilution of $\frac{1}{64}$, 200 $DICT_{50}$ of the homologous virus in cultures of lung fibroblasts. On the other hand, this same serum has no neutralising effect in ovo on the virus of Carre's disease (avianised strain, inoculated on the chorio-allantoic membrane); it also does not neutralise the cytopathogenic effect of the virus of Rubarth's disease on the lung fibroblasts of the foetus of a dog. On the other hand, the serum of a rabbit immunised against the virus of Carre's disease (avianised strain) and neutralising, in a dilution of $\frac{1}{32}$, $10^3$ $DICT_{50}$ of the homologous virus in ovo exerts no neutralising effect on the new virus in cultures of lung fibroblasts of the foetus of a dog.

The cytopathogenic effect of $10^3$ $DICT_{50}$ of the above-described newly isolated virus was neutralised by a dilution of $\frac{1}{64}$ of the serum of a dog of the Beagle breed immunised against the strain of canine herpetic virus isolated by Carmichael, Squire and Krook [Amer. J. Vet. Res. 26 803 (1965)]. On the other hand, the serum of a rabbit immunised against the virus described in the present invention neutralised, in a dilution of $\frac{1}{64}$, the cytopathogenic effect on the lung fibroblasts of a dog's foetus, both of the homologous virus and of the canine herpetitis virus isolated by Carmichael et coll. It may therefore be concluded that there is a close antigenic relationship between these two viruses.

(b) Action of 5-iodo-2'-desoxyuridine: In a concentration of 60 µg./cc. 5-iodo-2'-desoxyuridine totally inhibits the cytopathogenic effect of the new virus; it retards it for only 24 hours in a concentration of 30 µg./cc.; in lower concentrations, 5-iodo-2'-desoxyuridine exerts no inhibiting effect.

Although the viruses containing desoxyribonucleic acid already described (vaccines, herpes virus hominis) are generally inhibited by concentrations of 5-iodo-2'-desoxyuridine below 30 µg./cc., the fact that the newly described virus is sensitive to the inhibiting effect of this antimetabolite suggests that it is a desoxyribonucleic acid virus, which is in agreement with the observations made above in regard to its antigenic relationship with the canine herpetitis virus.

According to the present invention, a process for the preparation of an inactivated viral suspension comprises inoculating a cellular culture, in a medium known per se for the propagation of canine viruses, with a virus cultivated in vitro and isolated from renal cells of a dog (preferably a pup) infected by rhinitis and bronchopneumonia, said virus being capable of producing in the young dog lesions of pneumonia, hepatitis, nephritis and encephalitis, incubating the inoculated culture until a cytopathogenic effect is produced, liberating the virus from the cells, removing the cellular debris, and inactivating the infectivity of the viral suspension thus obtained by methods known per se. By the term "methods known per se" is meant chemical or physical methods of inactivation of viruses heretofore used or described in the literature.

In practice, the cellular culture is preferably prepared from fibroblastic lung cells of the foetus of a dog, dispersed by trypsin and suspended in an appropriate culture medium.

Cultures obtained from lung fibroblasts of a dog's foetus have the advantage over cultures obtained from renal cells of a dog—generally employed for the propagation of canine viruses intended for the preparation of vaccines—in that they do not contain any viral agent in the latent state and that they lend themselves to subculture in series up to a certain number of passages and to freezing at various passage stages. As culture medium, there is preferably employed Eagle's medium [Science 130, 432 (1959)], to which there have been added calf serum in a concentration of 10% and antibiotic substances to prevent proliferation of bacteria and fungi. The procedure adopted is such as to obtain a monocellular layer in an appropriate receptacle (tube or flask) by incubation for 2 or 3 days at 37° C. These cultures are then inoculated with a dilution of the selected virus so as to obtain a maximum cytopathogenic effect after 2 or 3 days incubation at 37° C. The viral suspension is then collected by liberating the virus from the cells by bursting the latter (for example, by freezing followed by rapid thawing), and then eliminating the cellular debris by centrifuging or filtration. The viral suspension thus obtained is titrated by the Reed and Muench method deescribed above; the infective titer of a good preparation is of the order of $10^6$ $DICT_{50}$ per cc.

The viral suspension is thereafter inactivated. Not all conventional means of inactivation are suitable. More particularly, formaldehyde, while destroying the infectivity of the virus, impairs its immunising power.

Preferably, the inactivation is effected by addition of β-propiolactone (0.25 to 5 mg./cc.) and incubation for a period of 30 minutes to 6 hours at 37° C. The product thus obtained must have no cytopathogenic effect on the cellular cultures receptive to the intact virus.

Irradiation of an infectious suspension of the virus by means of ultra-violet rays also destroys its pathogenic power while preserving its immunising properties.

For veterinary use, there may be added to the inactive virus, which is the active product of the vaccine, an oily adjuvant (mineral or vegetable) or the inactivated viral particles may be adsorbed on an appropriate insoluble support such as aluminium hydroxide. The vaccine thus prepared may be employed to immunise young pups against certain respiratory syndromes.

The following examples illustrate the invention.

Example I

The foetus of a dog is extracted by Caesarean operation at about the 50th day of gestation, and the lungs are removed. These lungs are finely cut up by scissors and subjected to the action of 30 cc. of 0.25% trypsin solution (1:200) for 3 hours at 37° C. The cells are collected by centrifuging and resuspended in Eagle's medium [Science 130, 432, (1959)] to which there have been added 10% of calf serum, 100 μg./cc. of penicillin and streptomycin and 50 μg./cc. of nystatin, so as to obtain a concentration of $10^5$ cells per cc.

600 cc. Roux flasks receive 80 cc. per flask of this suspension; they are stoppered with rubber and incubated in a horizontal position at 37° C. At the end of 2 days, there is obtained a confluent monocellular layer of fibroblasts adhering to the glass. The supernatant liquid is rejected and each culture is inoculated with 8 cc. of a suspension of the virus titrating $10^5$ $DICT_{50}$ per cc. After incubation for one hour at 37° C. to permit absorption of the virus in the cells, there are added to each flask 72 cc. of Eagle's medium to which the same substances have been added as before. The flasks are incubated in the horizontal position at 37° C. for 2 days; microscopic examination of the cells then reveals a very marked cytopathogenic effect of the virus. The mixture of supernatant liquid and cells is collected after rapid freezing and thawing of the flasks. The suspensions is centrifuged at 3,000 r.p.m. for 15 minutes at 4° C., and the supernatant liquid constituting the virulent suspension is collected. The infective titer of this suspension, determnied in cultures of lung fibroblasts of a dog's foetus, is $10^{6.2}$ $DICT_{50}$ per cc. To this suspension is added 1 mg./cc. of β-propiolactone, and it is incubated for 2 hours at 37° C. This suspension, either pure or diluted, is inoculated into cultures of lung fibroblasts of a dog's foetus incubated at 37° C. and examined under a microscope every day for 7 days. No cytopathogenic effect was observed. The infectivity of the virus was therefore entirely destroyed by the treatment with β-propiolactone. The virus thus inactivated is kept at 4° C., in stoppered bottles, away from light.

Example II

The vaccine can also be prepared by inoculation of the virus in cultures of lung fibroblasts of a dog's foetus obtained by repeated transfer of the above-described original culture.

A 600 cc. Roux flask receives 80 cc. of a suspension of fibroblastic lung cells of a dog's foetus, obtained by trypisnation (addition of 20 cc. of an 0.25% trypsin solution (1:200) per flask) of an earlier culture of these same cells, propagated in a similar flask.

After incubation under the same conditions as described in Example I, the derived cultures thus obtained are inoculated as in the preceding example with the virus; a virulent suspension titrating $10^{6.5}$ $DICT_{50}$ per cc. is obtained. 3 mg./cc. of β-propiolactone are added to this suspension and it is incubated for 2 hours at 37° C. The destruction of the infectivity of the virus is verified as above, and it is kept in the same way.

To 10 volumes of the suspension of inactivated virus, obtained by one or the other of the two preceding methods, there are added under aseptic conditions 9 volumes of a light mineral oil (Bayol F) and 1 volume of mannitol oleate (Arlacel); this mixture is emulsified by means of an Ultra-Turrax disperser. The stable, homogeous emulsion thus obtained is distributed in sterile 5 cc. ampoules in a proportion of 3 cc. per ampoule; the ampoules are sealed and kept at 4° C. away from the light.

Immunisation of dogs

Experiments with the inoculation of pups (aged about 3 weeks) with the un-inactivated virus by the intraperitoneal or intranasal route have shown that in the animals which survived a level of antibodits of 1/64 to 1/128 could be detected in the serum, one month after the infection. (The level of antibodies is expressed by maximum dilution of the serum neutralising the cytopathogenic effect of 200 $DICT_{50}$ of virus in cultures of lung fibroblasts of the foetus of a dog.) The intravenous injection of $10^5$ to $10^6$ $DICT_{50}$ of virus (in a volume of 1 cc.) in these dogs produced no morbidity and no mortality, and the proportion of antibodies in these animals remained unchanged. It may therefore be concluded that a proportion of serous antibodies of 1/64 to 1/128 is sufficient to ensure satisfactory immunity.

A study of the immunising power of the above-described vaccine was therefore made for the purpose of determining its capacity to produce the formation of neutralising antibodies in the adult dog.

Three adult dogs were chosen by reason of the absence of any antibody neutralising the virus in their serum. The first received an intramuscular injection of one ampoule of the vaccine prepared as described in Example II, i.e. 3 cc. of vaccine inactivated by 3 mg./cc. of β-propiolactone and emulsified in the described oily adjuvant; the second an intramuscular injection of one ampoule of vaccine prepared as in Example II, but employing the vaccine prepared by the procedure described in Example I, i.e. 3 cc. of vaccine inactivated by 1 mg./cc. of β-propiolactone, and also emulsified in the same adjuvant; the third an intramuscular injection of 3 cc. of adjuvant alone.

Ten days later, these injections are repeated in the same quantities and in accordance with the same experimental protocol.

The animals are housed apart and their state of health is regularly checked. No morbid symptom was observed in the course of the period of one month following the administration of the last injection.

Thirty-two days after this last immunisation, blood is taken from each of the dogs and the serum is separated. The proportion of antibodies neutralising the virus present in the serum of the dogs was determined by the above-described method. The results obtained are the following:

| Dog No. | Immunisation by— | Antibody level |
|---|---|---|
| 1 | 2X3 cc. of vaccine inactivated by 3 mg./cc. of β-propiolactone. | 1/128 |
| 2 | 2X3 cc. of vaccine inactivated by 1 mg./cc. of β-propiolactone. | 1/256 |
| 3 | Control (having received 2X3 cc. of adjuvant) | <1/4 |

Immunisation by the vaccine containing the virus inactivated by β-propiolactone and emulsified in an oily adjuvant therefore makes it possible to obtain a level of antibodies equal to or greater than that resulting from a natural infection.

We claim:
1. Process for the preparation of an inactivated viral suspension for a vaccine to immunize young dogs against rhinitis and bronchopneumonia, which comprises inoculating a cellular culture of fiibroblastic lung cells of a dog foetus, in a medium for the propagation of canine viruses, with a virus cultivated in vitro and isolated from renal cells of a dog infected by rhinitis and bronchopneumonia, said virus being capable of producing in the young dog lesions of pneumonia, hepatitis, nephritis and encephalitis, incubating the inoculated culture until a cytopathogenic effect is produced, liberating the virus from the cells, removing the cellular debris, and inactivating the infectivity of the resulting viral suspension with ultraviolet irradiation or with propiolactone.

2. Process according to claim 1 in which the cellular culture inoculated with the virus is prepared from fibroblastic lung cells of the foetus of a dog taken by Caesarian section during gestation.

3. Process according to claim 1 in which the virus is isolated from the renal cells of a pup.

4. Process according to claim 3 wherein the cellular culture medium is Eagle's medium with the addition of 10% calf serum and at least one antibiotic, 5. Process according to claim 1 in which the cellular culture inoculated with the virus is incubated for two to three days at about 37° C.

6. Process according to claim 1 in which the infectivity of the viral suspension obtained is inactivated by addition of β-propiolactone and incubation of the resulting suspension at moderate temperature.

7. Process according to claim 1 in which the infectivity of the viral suspension obtained is inactivated by irradiation of the suspension with ultra-violet rays.

8. Process according to claim 1 which comprises inoculating a cellular culture prepared from fibroblastic lung cells of the foetus of a dog, in a medium for the propagation of canine viruses, with a virus cultivated in vitro and isolated from renal cells of a pup infected by rhinitis and bronchopneumonia, said virus being capable of producing in the young dog lesions of pneumonia, hepatitis, nephritis and encephalitis, incubating the inoculated culture for two to three days at a temperature of about 37° C. until a cytopathogenic effect is produced, liberating the virus from the cells by bursting said cells, removing the cellular debris by centrifuging or filtration, and inactivating the infectivity of the resulting viral suspension.

9. Process according to claim 8 wherein the infectivity of the resulting viral suspension is inactivated by addition of β-propiolactone and incubation of the resulting viral suspension at moderate temperature.

10. Vaccine for immunizing young dogs against rhinitis and bronchopneumonia which comprises an adjuvant oil or aluminum hydroxide adsorbent containing, as active product, an inactiviated viral suspension obtained by inoculating a cellular culture of dog foetus fibroblastic lung cells in a medium for the propagation of canine viruses, with a virus cultivated in vitro and isolated from renal cells of a dog infected by rhinitis and bronchopneumonia, said virus being capable of producing in the young dog lesions of pneumona, hepatitis, nephritis and encephalitis, incubating the inoculated culture until a cytopathogenic effect is produced, liberating the virus from the cells, removing the cellular debris, and inactivating the infectivity of the resulting viral suspension with ultraviolet irradiation or with beta-propiolactone.

References Cited

Carmichael et al., P.S.E.B.M. 117 (3): 826–833 (Dec. 1964).

Stewart et al., Science 148 (3675): 1341–1343 (June 4, 1965).

Carmichael et al., Am. J. Vet. Res. 26(113): 803–814 (July 1965).

Strandberg et al., J. Bact. 90(6): 1790–1792 (Dec. 1965).

Carmichael et al., P.S.E.B.M. 129(2): 644–650 (Dec. 1965).

Spertzel et al., P.S.E.B.M. 120(3): 651–655 (Dec. 1965).

Schwartz et al., VeMed Small Anim. Clin. 61, 1171–1173 (1966).

Prydie et al., Vet. Rec. 79: 660–661 (1966).

Cornwell et al., Vet. Rec. 79: 661–662 (1966).

Motohashi et al., Jap. J. Vet. Sci. 28: 307–314 (1966).

RICHARD L. HUFF, Primary Examiner

S. K. ROSE, Assistant Examiner

U.S. Cl. X.R.

195—1.2, 1.4; 424—89